Feb. 20, 1968  E. R. HOLMSTROM ET AL  3,370,114
METHOD OF PREPARING NONDIRECTIONAL VINYL FLOORING
Filed Aug. 10, 1964
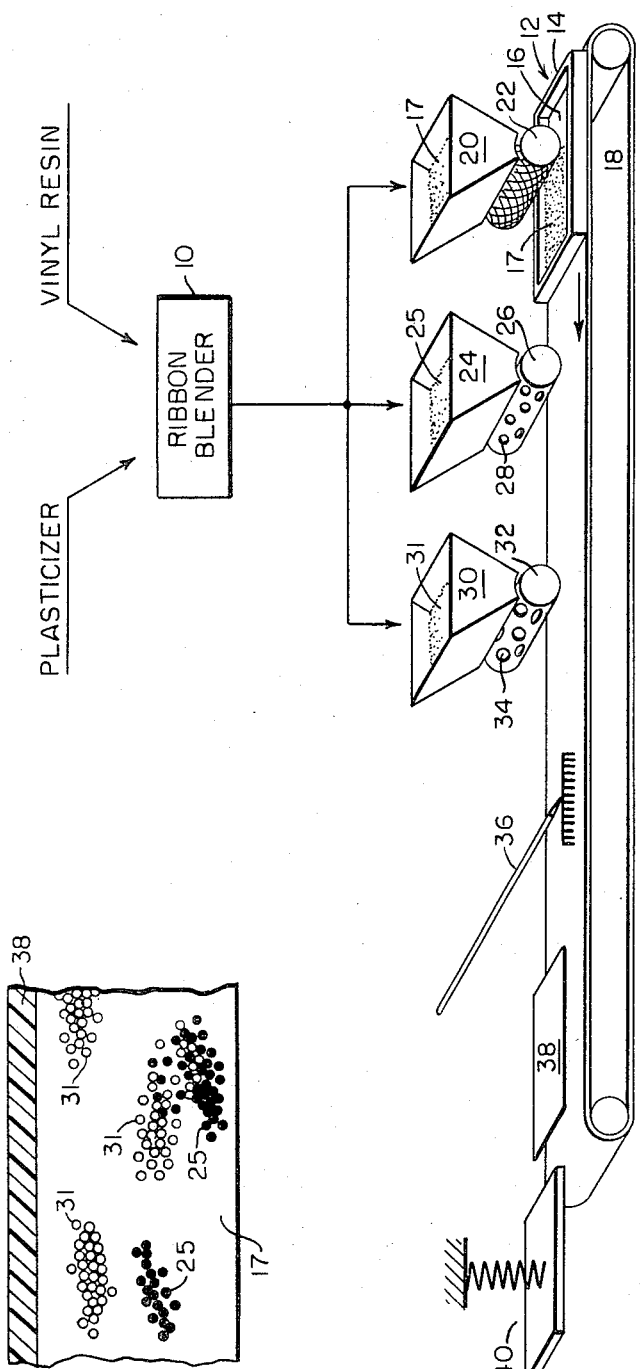
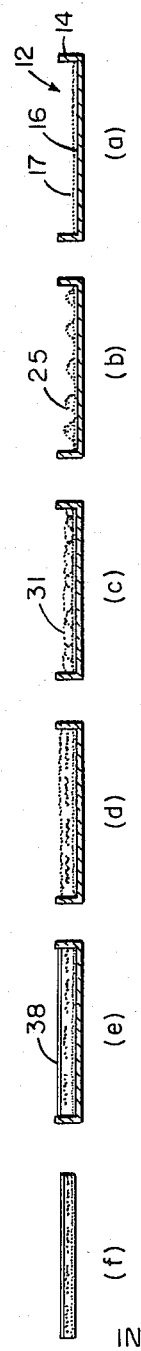
INVENTORS
ERNEST R. HOLMSTROM
MERRILL M. SMITH
NATALIE S. MARCUS
BY
Kenway, Jenney & Hildreth
ATTORNEYS

United States Patent Office 3,370,114
Patented Feb. 20, 1968

3,370,114
METHOD OF PREPARING NONDIRECTIONAL VINYL FLOORING
Ernest R. Holmstrom and Merrill M. Smith, Morrisville, Pa., and Natalie S. Marcus, Trenton, N.J., assignors to American Biltrite Rubber Co., Inc., Trenton, N.J., a corporation of Delaware
Filed Aug. 10, 1964, Ser. No. 388,593
9 Claims. (Cl. 264—77)

ABSTRACT OF THE DISCLOSURE

This invention is a method of making decorative sheet flooring, such as floor tiles, which has a nondirectional, nonrepetitive marbleized-appearing pattern, the method comprising providing in a suitable mold a plurality of layers of vinyl resin powder particles of less than about 60-mesh particle size and preferably less than about 100-mesh average particle size. The fact of the particles being less than about 60-mesh particle size is critical in order to obtain the correct marbleized appearance in the end product of this invention. Three layers are provided in the mold, and then the second and third layers are disturbed in a random manner so as to intermingle the particles to create the desired nondirectional pattern or swirl designs. If desired, the powdered resins may be initially deposited in the mold in a predetermined desired pattern, in which case the step of disturbing these predetermined patterns may be omitted. Or, a combination of the two may be used. After the particles are thus disturbed, the particles are then pressed without further disturbance under heat in the mold in order to fuse the particles together. Thereafter the hot-pressed material is cooled to room temperature. By the method, directional effects in the final pattern are greatly reduced, if not eliminated completely.

Our invention relates to a method of preparing nondirectional vinyl floor tile. In particular, our invention concerns an inexpensive method of preparing solid vinyl floor tile characterized by a marbleized nondirectional appearance.

Transparent, translucent or solid homogeneous vinyl floor tile is commonly prepared by mixing vinyl resin with a plasticizer in a Banbury mixer and subsequently adding small amounts of a colored or opaque vinyl compound to the Banbury or a two roll mill. This mixture is then calendered and pressed at a high temperature into a sheet material. Floor tile so produced has a marbleized appearance, but also exhibits relatively uniform and directional marbleized or streaked, longitudinal patterns due to the calendering operation. Additionally, this method requires a Banbury mixer, a calender and other relatively large and expensive capital equipment.

It is, therefore, an object of our invention to provide a method of preparing a novel vinyl floor tile which is nondirectional and a method of preparation which is relatively simple and inexpensive compared to existing methods of preparing directional floor tile.

Another object of our invention is to provide a method of preparing a vinyl floor tile characterized by nonrepetitive, nondirectional marbleized patterns.

Other objects of our invention will be apparent to those skilled in the art from the following detailed description of our invention taken in conjunction with the accompanying drawing.

FIG. 1 of which is a schematic illustration of the steps of one method of preparing marbleized, nondirectional vinyl floor tile of our invention with illustrative, cross-sectional views at each step of the operation; and FIG. 2 is an enlarged partial cross-sectional view of a transparent marbleized tile prepared by the method of FIG. 1.

Our floor tile material may be prepared by providing a dry, plasticized, powdered vinyl composition composed of vinyl resin powder particles of less than about 60-mesh particle size and preferably less than about 100-mesh average particle size. Vinyl resin granules or flakes or particles of larger size are unsuitable for the purposes of our invention since, as will be apparent in our description, these large particles tend to produce tile of an unhomogeneous character and poor appearance and quality. The powdered vinyl resin blend is then distributed in a relatively uniform, continuous layer in an open, flat-plate mold having side rails of the desired height. The mold may have a smooth flat bottom surface or an engraved design surface depending upon the top surface characteristics desired in the finished tile.

In one embodiment the first dry powder resin will, on hot pressing, provide a transparent vinyl resin layer in the mold. A random layer of a similar, but second colored powdered resin blend is then deposited on the first powdered resin layer. This layer may be a discontinuous layer. This colored blend may be deposited in a uniform, metered manner or in nonuniform quantities and predetermined design patterns. Usually a third and different colored powdered resin blend is distributed over the second powdered blend. The second and third powdered blends and the transparent continuous layer are then disturbed in a random manner to intermingle the powdered blends to create the desired nondirectional pattern or swirl designs. Where the powdered resins are deposited in the mold in a predetermined desired pattern the step of intermingling and disturbing this pattern may be omitted. Commonly, the second and third powdered blends are primarily disturbed and intermingled, rather than the transparent continuous layer. Disturbing may be accomplished by hand methods such as by indiscriminate raking of the powdered blends or by mechanical means such as a scratch roll. A precut, opaque vinyl resin backing sheet may then be placed on top of the disturbed powdered blends as an inexpensive backing layer. The mold is then placed in a typical hot press apparatus and the opaque backing sheet covered with a flat platen and the entire powdered mass in the mold hot pressed at 50 to 2,000 p.s.i.g. e.g., 1000 to 1500 p.s.i.g. at 310° to 360° F. for three to ten minutes. The hot pressed material is then usually cooled to less than 150° F. before the molding pressure is relieved.

In the hot pressing operation the random nondirectional patterns created by disturbing the powdered blends are retained and considerably reduced directional effects are apparent in the finished floor tile. Our method avoids the use of heavy capital equipment, requires only a minimum labor and creates a marbleized floor tile of authentic, nondirectional character. On hot pressing, the powdered resin particles are fused together in the manner of sintering to produce a homogeneous floor tile. The employment of fine particle size resin powder permits the hot pressed material to have a homogeneous appearance to labor and creates a marbleized floor tile of authentic, particle sizes are used, a low power, microscopic examination might indicate the fuzzy outline of the boundary fused original resin particles. The use of fine resin particles promotes the ease and rapidity of particle fusion. Larger size flakes and granules tend to give an unhomogeneous pattern under similar hot pressing conditions, and permit the visual observation of the outline of the discrete vinyl particles.

In the preparation of our marbleized floor tile material it is essential that only finely divided thermoplastic powder be employed, and that the first powder blend be capable of being hot pressed into uniform and preferably transparent or at least translucent resin layer. The second and following layer may be white or colored and disturbed or undisturbed prior to the pressing and fusing operation. Our method permits a large amount of flexibility in the ultimate design of the floor tile, since the second powder layer may be discontinuous and undisturbed, continuous and disturbed, and discontinuous and disturbed, depending on the designs and style desired. Where opaque colors are used in all the powdered resins, the powdered blends are disturbed to produce an intermingling and random design effect. Marbelized floor tile of particularly attractive random and nondirectional appearance is produced by a first continuous clear resin layer and disturbed discontinuous random white and colored powder resin blend.

The accompanying drawing illustrates a particular method of producing marbleized floor tile of our invention. Powdered polyvinylchloride resin particles of average particle size of between 100–150 mesh are placed in a ribbon blender 10 with primary and secondary plasticizers such as alkyl phthalates like butyl-octyl and dioctyl phthalate, or epoxidized soy beam oil and other conventional plasticizers and heat stabilizer additives such as barium-cadmium fatty acid soaps. Sufficient plasticizer is employed to be absorbed by the resin powder and to plasticize the resin on fusion, by 20–70 parts of plasticizer per 100 parts of resin. A typical formulation would comprise:

| | Parts |
|---|---|
| Polyvinylchloride | 100 |
| Dioctyl phthalate | 30 |
| Epoxidized soy bean oil | 5 |
| Barium-cadmium oleate | 3 |
| Stearic acid | 0.2 |
| | 138.2 |

The mixture is blended to produce a dry plasticized powdered resin blend 17 which is charged to hopper 20. A pigment or filler such as 2–15 parts of a metal oxide or inorganic compound such as titanium dioxide, calcium carbonate, zinc oxide and the like, is blended with a portion of the clear resin blend 17 in the blender 10 or a separate blender to produce a white or egg shell colored resin powder blend 31 which is charged to hopper 30. An inorganic colored pigment is blended with a portion of the white resin blend 31 to produce a colored dry powder blend 25 which is charged to hopper 24.

A conveyor belt 18 or other means of transporting at a uniform rate a substantially square, open flat plate mold 12 through the various steps of the process is employed. The mold 12 comprises a smooth, flat metal bottom 16 and side rails 14 of predetermined height depending on the depth of the powdered layers employed in the process. The mold 12 is placed on the moving conveyor 18 and passed under the first hopper 20 which has a rotating knurled roll 22 adjacent the discharge opening slit in the bottom of the hopper 20. The knurled roll on rotation picks up a desired amount of the clear resin blend 17 and discharges it in a continuous uniform layer of about 1/8" to 1/4" deep over the bottom surface of the moving mold 12.

The mold is then passed beneath hopper 24 containing the colored resin powder 25, which hopper has a rotating roll 26 beneath the opening slit in the bottom of the hopper. The roll 26 is a smooth roll characterized by inset cavities 28 spaced in either a random or uniform manner over the surface of the roll, which cavities pick up resin from the hopper slit and deposit it upon 180° rotation in the mold. The cavities are of predetermined shape and depth as desired. I have found round cavities of about 1/8" to 1/4" in depth and 1" in diameter to be suitable for the purposes of our invention, although star-shaped, elliptical or other cavity designs may be used to create or aid in creating unusual design effects.

The mold 12 containing the clear uniform resin layer 17 and the discontinuous colored powder resin plugs from the cavities 28 lying over the clear resin surface is then passed under hopper 30 having a similar rotating roll 32 characterized by a plurality of cavities 34 on the roll surface to distribute the white resin powder 31 over the surface of the clear resin in the mold. In one embodiment, the roll 32 contains a larger number of cavities than roll 26 or is rotated at a greater speed so as to deposit a greater amount of resin plugs in the mold, or a combination of both a greater number of cavities and greater roll speed. In one operation the roll 32 is rotated at twice the speed of roll 26 and contains twice as many cavities 34 of 2" diameter. In producing marbelized, nondirectional tile it is often advantageous to have a greater amount of a white or pastel color to the darker colored resin blend.

The mold 12 containing the uniform, continuous, clear resin powder and the discontinuous, random plugs of white and colored resin powder is then disturbed by a worker using a rake 36 in a random manner to intermingle the resin powder and create a nondirectional random design. The rake 36 is drawn through the resin powder and tends to disturb and to intermingle second and third resin powders more than the continuous first resin layer, permitting the surface layer 17 of the resulting tile to represent about 5–50% of the transparent area of the tile.

Also, the mold may be passed under a rotating roll characterized by a plurality of rigid or semi-rigid protrusions or fingers of metal or rubber extending from and on the surface of the roll, the protrusions of uneven and random lengths. The roll may be moved downwardly as the mold travels beneath it to permit the rotating protrusions to disturb the second and third powder blend and to distribute the powder in a uniform pattern or a random design style primarily on the upper surface or slightly beneath the upper surface of the continuous clear layer. Where desired, the roll may be substituted or supplemented by employing personnel with a garden rake 36 to run the rake teeth back and forth across the mold several times to disturb the powdered vinyl resins in the mold 12. A typical method is to disturb the resin in lengthwise or crosswise raking motions for one to three motions over the entire surface or until the desired intermingling is obtained. A swirling, spiral or other disturbing pattern or motion may also be employed. Of course continual prolonged disturbing and intermixing of the resin powder should be avoided since a single colored resin blend will result.

An opaque, such as solid white flat vinyl resin (e.g., polyvinyl chloride), backing sheet precut to the mold dimensions is then placed on top of the disturbed resin powder. This sheet 38 serves as a reflecting background sheet for the transparent area of the floor tile. The backing sheet may also be any flat sheet material capable of being fused or bonded to the vinyl resin powder. For example, suitable backing sheet material would include vinyl-asbestos sheets, felt, woven and unwoven fabrics of natural and synthetic fibers, paper and the like alone or impregnated with thermoplastic resins. The resin powder blends, even though disturbed, should be maintained at a relatively even depth of 1/4" to 1/2" in the mold, the depth of course, based on the ultimate thickness of the floor tile desired. The mold 12 is then conveyed to a hot press 40 schematically illustrated, where the opaque backing sheet 38 and the resin powders are hot pressed and fused into a flat sheet floor tile material in which the random, disturbed, nondirectional pattern created is retained. FIG. 2 is an enlarged fractional and sectional view of the floor tile material produced by the method of FIG. 1. The floor tile has the opaque vinyl backing sheet 38 and a fused transparent mass of the clear resin 17 through which about 5 to 50 percent or more of the opaque backing sheet may be observed. Dispersed in the transparent mass 17 are marbleized patterns of the fused colored 31 and white 25 resin powder particles creating the nondirectional effect. The resin particles 17 when fused in the hot pressing operation having no pigments are relatively transparent and no discrete particles can be observed. However, the colored and white resin particles creating the pattern are fused and sintered together and close detached observation or examination under a low power microscope will reveal the fused particle structure, as illustrated in FIG. 2. The colored resin 25 and white resin 31 may create separate patterns or be intermixed as shown. The resin particles 25 and 31 may be entirely fused with the destruction of the particle outline in our method, but need not be so completely fused where the particle size is sufficiently fine and the normal use does not require such detailed inspection.

Our method does not produce directional effects in the opaque or colored sections of the floor tile due to directional kneading or calendering of the hot milled resin blend. The hot pressing operation should be carried out at temperatures and at times sufficient to permit the resin particles to fuse into a unitary product, so that the discrete powder particles will be unobserved by the naked eye. For example, in one embodiment, the hot pressing need not be of such temperature and time to completely destroy the powdered particles at least of the white or colored resin blends, but merely sufficient to promote fusion of the particle boundaries and to provide a coherent homogeneous resin sheet. Although our method and floor tile has been described in reference to vinyl halide resins such as polyvinylchloride and copolymers of vinyl chloride and short-chain fatty acids like vinyl acetate and the like, any powdered thermoplastic or thermosetting polymer alone or in combination with vinyl resins may be employed. The powdered blends should be capable of being fused or cross-linked by heat into homogeneous sheet material. For example, powdered thermoplastic materials such as acrylates like polymethacrylate, polyolefins like polyethylene and polypropylene and the like may be used.

The powdered materials may contain additives as desired such as asbestos, glass fibers, silica, clay, carbon black, metal oxides, like zinc oxide, titanium oxide, antioxidants, dyes, pigments, lubricants, hydrocarbon oils, waxes, plasticizers such as phosphorous acid esters like tricresyl phosphite, phthalates, adipic acid esters like di(2 ethyl hexyl) adipate and the like, accelerators, chemical blowing agents, stabilizers and the like.

Our method produces random, nondirectional vinyl floor tile which on being installed does not require the tile in each package to be turned to avoid a directional effect. Our floor tile may be produced by relatively inexpensive equipment, at a minimum labor cost, and by a simple fabricating operation.

What we claim and desire to protect by Letters Patent is:

1. A method of producing marbleized floor tile material characterized by nondirectional, random design patterns which method comprises:
    depositing in a plate mold a continuous, relatively uniform layer of a first plasticized vinyl resin powder;
    distributing on the first layer, a discontinuous layer of a second plasticized vinyl resin powder of a different color than the first powder, the first and second powders having an average particle size of less than about 60 mesh;
    disturbing the first and the second resin into a random, nondirectional powdered pattern to a relatively uniform depth in the mold; and
    hot pressing the first and second resin powders into a fused, homogeneous sheet material.

2. The method of claim 1 wherein a precut, flat, opaque vinyl resin backing sheet is placed on the disturbed powdered resin prior to hot pressing.

3. The method of claim 9 wherein the second resin is distributed in resin masses of predetermined design and depth.

4. The method of claim 1 wherein the first resin powder on fusion is a transparent resin.

5. The method of claim 1 wherein the resin powder has an average particle size of from 60 to 200 mesh.

6. A method of producing a marbleized flooring material characterized by a nondirectional, random design which method comprises:
    depositing a continuous, relatively uniform layer of a first plasticized vinyl resin powder in a flat plate mold, the resin powder capable on fusion of forming a transparent, wear-resistant floor surface;
    distributing a discontinuous layer of a second plasticized, colored vinyl resin powder on the first layer;
    distributing discontinuous layer of a third plasticized, colored vinyl resin powder on the first and second layer;
    disturbing primarily the second and third discontinuous masses of vinyl resin powder to provide a random, nondirectional pattern of the second and third powders at a relatively uniform depth in the mold; all vinyl resin powder employed having an average particle size of less than about 60 mesh;
    placing a precut, opaque vinyl resin backing sheet on the distributed resin powder; and
    hot pressing the backing sheet and resin powder into a fused, homogeneous flat sheet material containing transparent portions through which the opaque backing may be observed against a colored marbleized design.

7. A method of preparing vinyl flooring which method comprises:
    depositing in a flat plate mold a continuous, relatively uniform first layer of a first plasticized vinyl resin powder;
    depositing on the first layer a continuous relatively uniform second layer of a second plasticized vinyl resin powder of different color than the first layer, both the first and second resin powders having a particle size of less than 60 mesh;
    disturbing the first and second resin powder layers randomly to produce a random, nondirectional intermingling of the first and second resin powders; and
    thereafter hot pressing the first and second vinyl resin powders to fuse them into a flat, homogeneous floor tile material.

8. A method of preparing vinyl flooring which method comprises:
    depositing in a flat plate mold a continuous, relatively uniform first layer of a plasticized vinyl resin powder;
    depositing on the first layer in a random, discontinuous pattern a second plasticized vinyl resin powder of different color than the first layer, both the first and second resin powders having a particle size of less than 60 mesh;
    disturbing the first and second resin powder layers to produce a uniform depth and a random, nondirectional intermingling of the first and second resin powders; and
    thereafter hot pressing the first and second vinyl resin powders to fuse them into a flat homogeneous floor tile material.

9. A method of preparing vinyl flooring which method comprises:
    depositing in a flat plate mold a continuous, relatively uniform first layer of a first plasticized vinyl resin powder, the first layer being deposited in a predetermined design pattern;

depositing on the first layer a relatively uniform second layer of a second plasticized vinyl resin powder of different color than the first layer, the second layer being deposited in a predetermined design pattern and both the first and second resin powders having a particle size of less than 60 mesh; and thereafter hot pressing the first and second vinyl resin powders to fuse them into a flat homogeneous floor tile material.

References Cited

UNITED STATES PATENTS

| | | | |
|---|---|---|---|
| 2,275,592 | 3/1942 | Menihan | 246—113 |
| 3,012,901 | 12/1961 | Reese | 264—112 |
| 3,070,838 | 1/1963 | Hostettler | 264—112 |
| 3,218,382 | 11/1965 | Benedict | 264—122 |

ROBERT F. WHITE, *Primary Examiner.*

J. R. HALL, *Assistant Examiner.*

UNITED STATES PATENT OFFICE
CERTIFICATE OF CORRECTION

Patent No. 3,370,114                                                 February 20, 1968

Ernest R. Holmstrom et al.

It is hereby certified that error appears in the above numbered patent requiring correction and that the said Letters Patent should read as corrected below.

Column 2, lines 65 and 66, strike out "labor and creates a marbleized floor tile of authentic, particle sizes are used," and insert instead -- the naked eye, although where smaller, 200 to 100-mesh particle sizes are used, --.

Signed and sealed this 29th day of April 1969.

(SEAL)
Attest:

Edward M. Fletcher, Jr.                                 EDWARD J. BRENNER
Attesting Officer                                             Commissioner of Patents